United States Patent [19]

Frasher et al.

[11] 4,130,757

[45] Dec. 19, 1978

[54] APPARATUS FOR MICROSCOPICALLY VIEWING A SPECIMEN WHILE DETECTING RADIATION PARTICLES THEREFROM

[75] Inventors: Wallace G. Frasher, Pasadena; Daniel J. Netto; Carol S. Marcus, both of Los Angeles, all of Calif.

[73] Assignee: University of Southern California, Los Angeles, Calif.

[21] Appl. No.: 810,707

[22] Filed: Jun. 28, 1977

[51] Int. Cl.² .................. G01J 1/00; G01N 23/00; G02B 7/00
[52] U.S. Cl. ..................... 250/336; 250/358R; 250/491; 350/81
[58] Field of Search ............ 250/336, 358 R, 491; 350/81; 324/33

[56] References Cited

U.S. PATENT DOCUMENTS

| | | | |
|---|---|---|---|
| 2,761,072 | 8/1956 | Wormser | 73/355 R |
| 3,400,266 | 9/1968 | Yoder et al. | 350/81 |

*Primary Examiner*—Alfred E. Smith
*Assistant Examiner*—Janice A. Howell
*Attorney, Agent, or Firm*—Nilsson, Robbins, Dalgarn, Berliner, Carson & Wurst

[57] ABSTRACT

An apparatus for microscopically viewing a specimen while detecting particles or other species of radiation emanating therefrom, including a reflecting objective and radiation detector in the optical dead cone of the secondary mirror of the objective.

21 Claims, 5 Drawing Figures

APPARATUS FOR MICROSCOPICALLY VIEWING A SPECIMEN WHILE DETECTING RADIATION PARTICLES THEREFROM

FIELD OF THE INVENTION

The invention relates to radiation detectors and to microscope objectives.

BACKGROUND AND SUMMARY OF THE INVENTION

This invention provides a spatially discriminating particle detector, more generally, radiation detector, which enables one to microscopically view a specimen while detecting particles or other species of radiation emanating from the specimen. The apparatus provided may include means for limiting detection to particles or radiation emitted from a small area within the field of view. The discussion and description of the invention which follows is for the most part specifically directed to particle detection. However, it will be appreciated that the invention may generally be applied to the detection of other species of radiation. The most immediate application of the invention is in the field of medicine in the detection of radioisotope flow through a microscopically small part of a specimen which is also being viewed. More specifically, the radioisotope can be monitored with the goal of geometrically and temporally tracing, for example, blood flow or lymphatic drainage.

Solid state detectors have previously been placed in small bore needles for the purpose of detecting particles radiating from tissue penetrated by the needle. However, the detection is blind in that the tissue is not under visual observation. Also, means for restricting the particles detected to those radiated from a microscopically small area has not been achieved.

The invention permits the desired visual observation and particle detection through the use of a microscope objective coupled with a particle detector. The objective includes a primary mirror for receiving light directly from the specimen and a secondary mirror positioned to receive light reflected from the primary mirror and to reflect it again for viewing. The particle detector is placed in the optical shadow (alternatively called the optical dead cone or optical dead space) of the secondary mirror and receives particles radiated directly from the specimen. In a particular embodiment, the mirrors and detector are on a single axis and light from the specimen reflected from the secondary mirror may be viewed through an opening in the primary mirror. The apparatus may include wall structure which absorbs the particles but which defines an elongated straight bore for admitting a predetermined portion of particles emitted from the field under observation.

DETAILED DESCRIPTION

Figure 1:
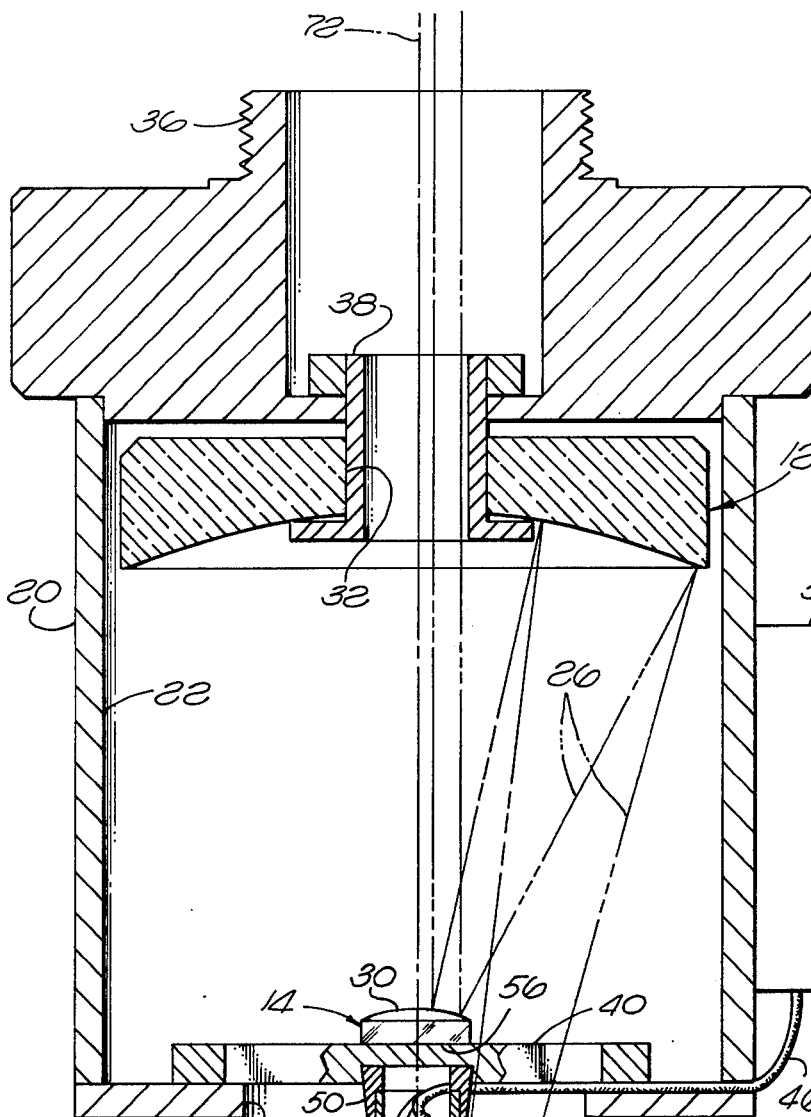
FIG. 1 is a diagrammatic sectional view of apparatus in accordance with the invention.

Referring to FIG. 1, key elements of the invention include a primary mirror 12, a secondary mirror 14, a particle detector 16 and a collimator 18 for limiting the extent of incidence of particles on the detector 16. The objective includes a housing 20 defining a cavity 22 formed with a circular access opening 24 through which light rays, illustrated by rays 26 from a specimen 28, enter the cavity 22 and strike the primary mirror 12. After being reflected by the primary mirror 12, the light rays 26 are reflected from a first side 30 of the secondary mirror 14, then travel through a central opening or aperture 32 in the primary mirror 12. The specimen 28 may be, for example, a section of tissue held in position by a clamp 34. The light rays 26 emanate from a source (not shown) below the part of the specimen which is under observation.

In this embodiment, the primary mirror 12 is concave and the secondary mirror 14 is convex, together forming a reflecting microscope objective. A specific example is an objective with 15X power, with a numerical aperture of 0.28 and with a resolution of approximately 0.975 micron.

In FIG. 1, the primary mirror 12 and secondary mirror 14 (the collecting optics of the apparatus) are arranged coaxially and face to face, with their optical axis aligned with the axis of the cavity 22 and with the central aperture 32 of the primary mirror 12 centered along the optical axis. As indicated by the threads 36, apparatus incorporating the invention may be, and in fact generally is, connected to instrumentation for further enlargement before viewing. The aforementioned embodiment, including the objective described above, has been used with instrumentation of 74X power.

The primary mirror 12 and secondary mirror 14 may be held in position by any convenient means. A grommet-like fixture 38, disposed in part within the primary mirror aperture 32, supports the primary mirror 12 and also closes off part of the aperture 32. The secondary mirror 14 may be conveniently held in position by screwing it into or adhesively attaching it to one or more narrow support members 40 connected to the housing 20. Such support members should be narrow so that they block only a small part of the access opening 24. Perpendicular interlocking members or members that connect to a central portion could be used. Such a central portion, in general, should be disposed substantially in the optical shadow of the secondary mirror, discussed below.

The detector mounting 42, exposed lead wires 44 for electrical connections to the detector 16, a portion of a shielded cable 46 from which the wires extend and the detector 16 are disposed within a detector housing 48. The detector housing 48 is conically shaped and located in the optical shadow (as hereinafter defined) of the secondary mirror 14. The top portion of the detector housing 48 is threadably received in a mating conical sleeve 50 which itself is adhesively mounted (but can be threadably connected or press fit) to a recess therefor in the support members 40. The detector mounting 42 is secured by its edge to an internal shoulder 52 of the detector housing 48, which shoulder 52 defines an access opening 53 to the detector 16. The cable 46 passes out of the detector housing 48 and receiving sleeve 50 and then along a support member 40 to the preamplifier 54.

Figure 2:
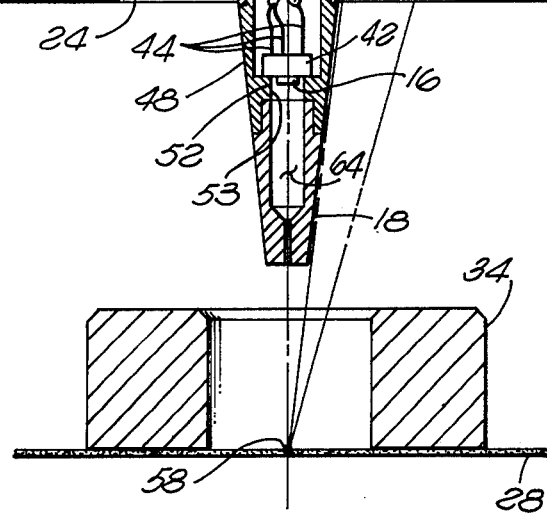
FIG. 2 illustrates the optical shadow of the secondary mirror of FIG. 1.

In accordance with the present invention, the particle detector 16 is disposed between the specimen 28 and the secondary mirror 14. With reference to the optical system alone the detector 16 is disposed on the side 56 of the secondary mirror 14 opposite the mirror's reflecting side 30. The detector 16 is attached to a mounting member 42 and electrically connected to the preamplifier 54. The detector 16 may be substantially embodied in a semiconductor chip that conveniently can be adhesively attached to the underside of the mounting 42 so that the detector 16 is in the optical shadow of the secondary mirror 14. Assuming, as is indicated in FIG. 1, that the objective is focused on a portion of the specimen 28 which one desires to microscopically view (more technically, focused at the point 58 at which an extension of the optical axis intercepts the specimen), the optical shadow is the region of space in which unobstructed light rays from the portion of the specimen being viewed (more technically, point 58) are intercepted by the secondary mirror 14. With reference to the optical system alone, and in general in accordance with the invention, the optical shadow of the secondary mirror can also be defined as the region of space in which light rays from the focal point of the objective are intercepted by the secondary mirror 14. FIG. 2 shows the optical shadow 60 of the secondary mirror 14, assuming, as is indicated in FIG. 1, that point 58 is the focal point of the objective.

Figure 3:
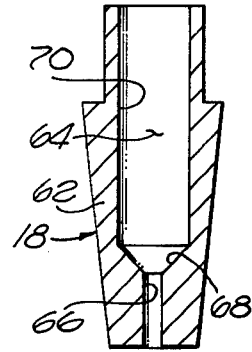
FIG. 3 is an enlarged view of part of the apparatus of FIG. 1.

An important feature of the detection system is its capability to limit the particles detected to those emitted from a microscopically small portion of a specimen. The particle-limiting collimator 18 of the apparatus shown in FIG. 1 facilitates this capability by limiting the extent of incidence of radiated particles on the detector 16. Referring to FIGS. 1 and 3, the collimator 18 includes a housing formed with a generally cylindrical wall 62 for absorbing particles radiated from a specimen. The wall 62 defines an elongated access bore 64 having an elongated constricted bore portion 66, located on this embodiment at the entrance of the bore 64, and other bore portions 68 and 70 of increasing diameter for transmitting radiated particles to the detector 16 through the detector access opening 53. The top portion of the collimator wall 62 is threadably received in a mating sleeve portion of the detector housing 48 depending from the housing shoulder 52. The system thus defines a radiation axis, shown by the dashed line at 72, passing through the center of the detector 16, which, in this embodiment, is colinear with the optical axis of the system. Note that the radiation axis does not need to be colinear as long as its location is defined and remains within the optical dead cone. The access opening 53 and access bore 64 through the detector housing 48 and collimator 18, respectively, are generally centered along the radiation axis 72.

As above described, connections between the detector housing 48, receiver sleeve 50 and collimator 18 are made with mating external and internal threads serving to connect said portions. However, the receiver sleeve 50, detector housing 48 and collimator 18, or any combination of adjacent ones of these components, could be integrally formed in one piece. In the embodiment of FIG. 1, provision is made for connecting and disconnecting interchangeable forms of the collimator. The three parts are each of a frustoconical shape and all are disposed substantially in the optical shadow of the secondary mirror 14.

Referring more specifically to FIG. 3, the collimator 18 shown was developed for use in the detection of beta particles emitted from a specimen. The collimator 18 is designed to be positioned, in the manner shown in FIG. 1 so that the entrance to the constricted bore 66 is approximately 5 millimeters (0.197 inch) from a specimen 28 and is maintained as long as the objective is focused on the tissue or substrate. It will be appreciated that a convenient location for the constricted bore is at the initial end of the collimator 18, but other locations (including a plurality of locations for a constricted bore having a plurality of parts) are permissible (perhaps desirable for specific purposes). The collimator 18 is designed so that when it is positioned as above, the extent of incidence of particles from the specimen 28 on the detector 16 is substantially determined by the geometry of the constricted bore 66. More particularly, it is designed so that only beta particles traveling substantially parallel to the axis of the constricted bore 66 (i.e., substantially parallel to the radiation axis 72), can pass through to the detector 16. Stated another way, it is designed so that the extent of beta particle detection is substantially limited to emissions from an area of the specimen 28 which is coextensive with the area of the opening to the constricted bore 66. In the particular design shown, the collimator 18 is constructed with its wall 62 formed of aluminum for absorbing beta particles and with the constricted bore 66 having a diameter of 170 microns (0.00669 inch) and a length of 0.813 millimeters (0.032 inch). Thus the ratio of the constricted bore length to diameter is approximately 5. The relatively short finite range of beta particles can, within limitations, be controlled by the choice of the radioisotope source and is of value in the design of the collimator 18. Relatively thin walls can therefore be used for absorbing beta particles, and this facilitates positioning of the collimator 18 in the optical shadow of the secondary mirror.

From the above, it is apparent that the configurations of various portions 68 and 70 of the access bore 64 are not critical. They mainly take the configuration shown to facilitate its formation. That formation can be accomplished by first drilling into a suitable blank, the end of the drill bit determining the configuration of the intermediate portion 68. The constricted bore 66 can be drilled from the opposite end using a much smaller diameter drill bit.

Figure 4:
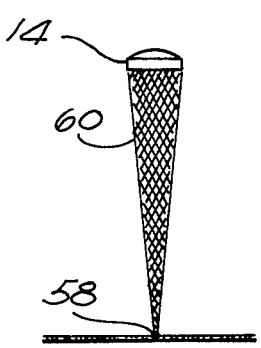
FIG. 4 is an enlarged view of an alternative embodiment for the part of the apparatus shown in FIG. 3.

In FIG. 4, an alternative embodiment 74, for a collimator is shown. In this embodiment the output end of the access bore 64 through the collimator 18 is plugged with a cylindrical piece of aluminum defining an additional constricted bore portion 76 that is identical to and aligned with bore 66.

Figure 5:
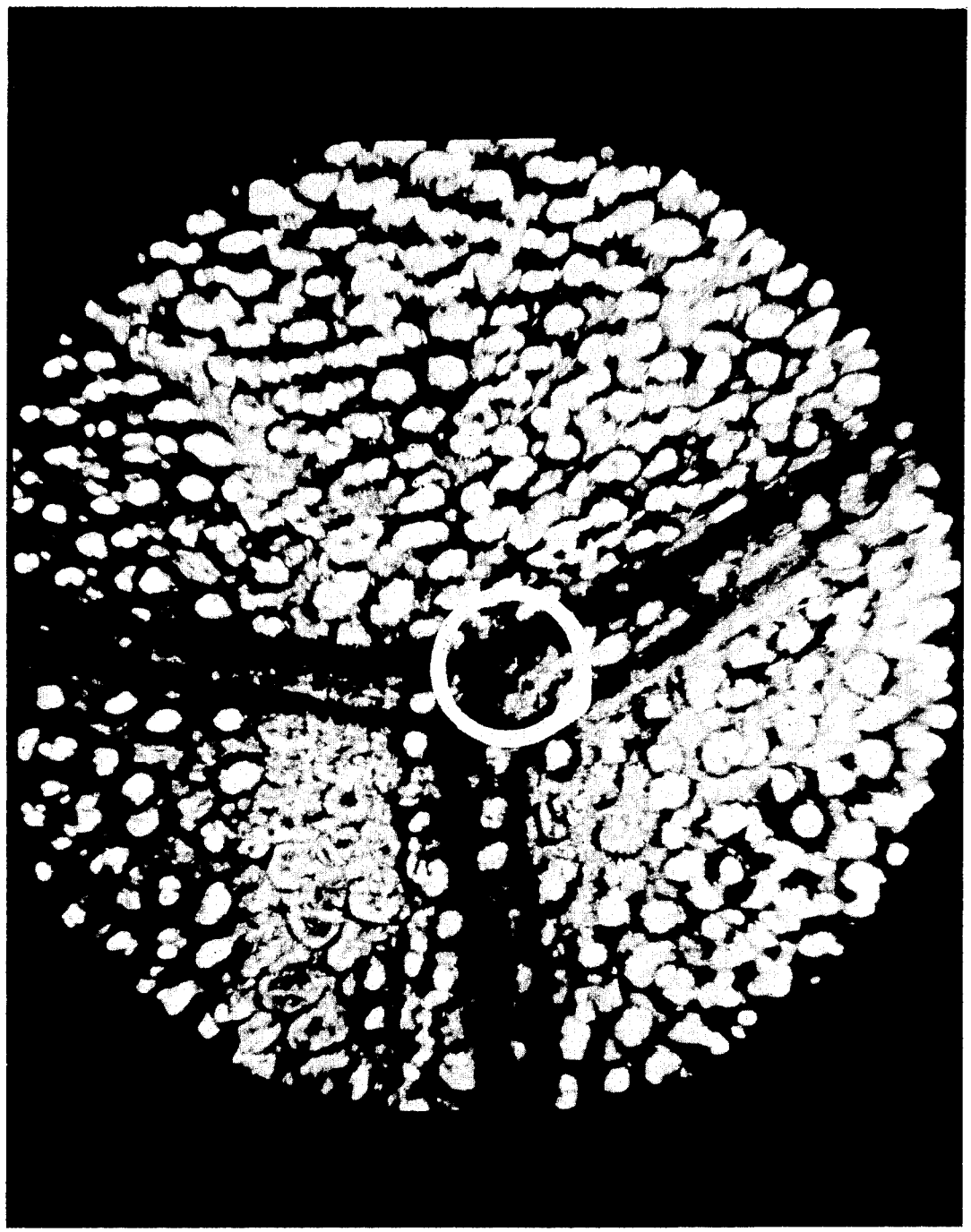
FIG. 5 is a photograph of part of a specimen viewed through instrumentation incorporating an embodiment of the invention, marked to delineate the area of particle detection.

Referring now to FIG. 5, there is shown a photograph taken through an eyepiece connected to apparatus of the type shown in FIG. 1. The specimen is an autoperfused cat mesentery in a constant temperature bath, the mesentery being a membrane which carries vessels leading from large vessels to the gut. The eyepiece used was of 75X power; the objective was of 15X power with a numerical aperture of 0.28 and a resolution of approximately 0.975 micron; and the collimator was as shown in FIG. 3, having the constricted bore length and diameter given above, and being formed of aluminum. The hand-drawn circle on the photograph has a diameter of 170 microns which approximates the area of the specimen from which radiated particles may be detected.

A detector of a type described in G. Keil and E. Lindner, "Los-Noise Silicon Planar Detectors for Room Temperature Application" *Nuclear Instruments and Methods* 104 (1972) 209–214, has been used with the foregoing eyepiece and apparatus to detect beta particle emissions from a cat mesentery. The detector may be described as a planar oxide-passivated p+n silicon guard ring detector, and is designed for applications requiring low noise at room temperature. The detector has been used with an aluminized Mylar (polyethylene terephthalate) shield 6.25 microns thick, which serves to block out moisture, light and dust. The shield may be positioned across the access opening 53 to the detector in FIG. 1, and it may be held there between the collimator 18 and the detector housing 52. The Mylar is not totally transparent to beta particles but its effect can be calibrated (as can the effect of air). The detector is substantially within the boundaries of a thin semiconductor chip and is essentially transparent to gamma radiation. This transparency is important since gamma radiation, in general, would be expected to occur with beta particle radiation and would otherwise contaminate the detection of beta particles. On the other hand, if only detectors sensitive to both beta particle radiation and gamma radiation were available, a beta particle detector could, for example, include two of the former detectors aligned on the radiation axis of FIG. 1, with a material disposed between them, on said axis, for absorbing beta particles. The detection of gamma radiation by the second detector could then be subtracted from the gamma radiation and beta particle radiation detected by the first detector.

The foregoing description has for the most part been concerned with particle detection although it will be appreciated that the invention has general application to radiation of all kinds. In this regard, a variety of detectors, including, for example, infrared sensitive detectors for heat detection, may be used in accordance with the invention. Thus the invention may be employed in thermography, and has a variety of applications beyond those specifically described.

It will also be appreciated that the description that has been given is by way of illustration and modifications in details may be made without departing from the spirit of the invention.

I claim:

1. Apparatus for detecting species of radiation from a specimen while microscopically viewing the specimen, comprising:
   a primary mirror for receiving light directly from a specimen;
   a secondary mirror positioned to receive light on a first side from the specimen reflected from said primary mirror and to reflect it for viewing; and
   a detector for said radiation species disposed on the opposite side of said secondary mirror to receive said radiation species directly from the specimen.

2. The apparatus of claim 1 wherein said detector is disposed substantially in the optical shadow of said secondary mirror.

3. The apparatus of claim 2 wherein said primary mirror defines a central aperture for the transmission for viewing of light from the specimen reflected from said secondary mirror, said primary mirror, secondary mirror and detector being all on a single axis.

4. The apparatus of claim 1, further comprising means for limiting the extent of incidence on said detector of said radiation species from the specimen.

5. The apparatus of claim 4 wherein said limiting means comprises a collimator having wall structure for absorbing said radiation species and defining an elongated bore therethrough for receiving and transmitting said radiation species from the specimen.

6. The apparatus of claim 5 wherein the material of said wall structure comprises aluminum.

7. The apparatus of claim 5 wherein at least a portion of said elongated bore is shaped to transmit only said radiation species moving substantially parallel to said bore.

8. The apparatus of claim 7 wherein said bore portion has a ratio of length to diameter of approximately 5.

9. In a microscope objective having a concave primary mirror and a convex secondary mirror arranged coaxially and face to face, said primary mirror defining a central aperture for a light beam from a first side of said secondary mirror to pass therethrough, the improvement for enabling the detection of species of radiation from a specimen while microscopically viewing the specimen through said objective, comprising a detector for said radiation species disposed substantially in the optical shadow of said secondary mirror on the side of said secondary mirror opposite said first side to receive said radiation species directly from the specimen.

10. The improvement of claim 9, further comprising means for limiting the extent of incidence on said detector of said radiation species from the specimen.

11. The improvement of claim 10 wherein said limiting means comprises a collimator having wall structure for absorbing said radiation species and defining an elongated bore therethrough for receiving and transmitting said radiation species from the specimen.

12. Apparatus for detecting species of radiation from a specimen while microscopically viewing the specimen, comprising:
   an objective housing defining a cavity and an access opening into one end of said cavity generally centered along the axis of said cavity;
   collecting optics disposed in said cavity including a relatively large primary mirror having a central aperture on an optical axis generally aligned with said cavity axis facing said access opening and a relatively small secondary mirror on said optical axis facing said primary mirror;
   a detector for said radiation species on a radiation axis colinear with said optical axis facing away from said primary mirror and positioned so that said secondary mirror is between said primary mirror and said detector.

13. The apparatus of claim 12 wherein said detector is disposed substantially in the optical shadow of said secondary mirror.

14. The apparatus of claim 12, further comprising a housing about said detector having an opening, generally centered along said radiation axis, for access to said detector from the direction in which said detector faces.

15. The apparatus of claim 14 wherein said detector housing is disposed substantially in the optical shadow of said secondary mirror.

16. The apparatus of claim 15, further comprising means for limiting the extent of incidence on said detector of said radiation species from a specimen.

17. The apparatus of claim 16 wherein said limiting means comprises a collimator having wall structure for absorbing said radiation species and defining an elongated bore generally centered along said radiation axis for transmitting said radiation species to said detector.

18. The apparatus of claim 17 wherein said limiting means is disposed substantially in the optical shadow of said secondary mirror.

19. The apparatus of claim 17 wherein the material of said wall structure comprises aluminum.

20. The apparatus of claim 17 wherein at least a portion of said elongated bore is shaped to transmit only said radiation species moving substantially parallel to said radiation axis.

21. The apparatus of claim 20 wherein said bore portion has a ratio of length to diameter of approximately 5.

* * * * *